United States Patent
Chadwick et al.

(10) Patent No.: US 7,320,020 B2
(45) Date of Patent: Jan. 15, 2008

(54) MAIL SERVER PROBABILITY SPAM FILTER

(75) Inventors: Michael Christopher Chadwick, Chandler, AZ (US); Adam Thomas Sink, Gilbert, AZ (US); Blake Schwendiman, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 935 days.

(21) Appl. No.: 10/418,006

(22) Filed: Apr. 17, 2003

(65) Prior Publication Data

US 2004/0210640 A1   Oct. 21, 2004

(51) Int. Cl.
*G06F 15/16* (2006.01)
(52) U.S. Cl. .................... 709/206; 709/204
(58) Field of Classification Search ............ 709/206, 709/204
See application file for complete search history.

(56) References Cited

U.S. PATENT DOCUMENTS

| | | | | |
|---|---|---|---|---|
| 6,161,130 | A * | 12/2000 | Horvitz et al. ............ | 709/206 |
| 6,732,157 | B1 * | 5/2004 | Gordon et al. ............ | 709/206 |
| 6,901,398 | B1 * | 5/2005 | Horvitz et al. ............ | 707/5 |
| 7,136,920 | B2 * | 11/2006 | Castell et al. ............ | 709/224 |

OTHER PUBLICATIONS

Mertz, Spam Filtering Techniques, http://gnosis.cx/publish/programming/filtering-spam.html, Aug. 2002, pp. 1-8.*
Relson, Multiple Wordlists, http://www.bogofilter.org/pipermail/bogofilter/2003-March/001783.html/ Mar. 2003, pp. 1-3.*
Burton Computer Corporation, SpamProbe v0.7 README, Sep. 2002, pp. 1-8.*
Paul Graham, A Plan for Spam, Internet Article, Aug. 2002.
Paul Graham, Better Bayesian Filtering, Jan. 2002.
Gary Robinson, Gary Robinson's Rants, Mar. 29, 2003.

* cited by examiner

*Primary Examiner*—Andrew Caldwell
*Assistant Examiner*—Grant M. Ford
(74) *Attorney, Agent, or Firm*—Stewart J. Womack (57) ABSTRACT

Email senders may transmit emails over the internet to a mail server that handles emails for a plurality of users (clients). The mail server may use a spam filter to remove the spam and then transmit the filtered emails to the addressed clients. The spam filter may use a white list, black list, probability filter and keyword filter. The probability filter may use a user mail corpus and a user spam corpus for creating a user probability table that lists tokens and the probability that an email is a spam if the email contains the token. The probability filter may also use a general mail corpus and a general spam corpus for creating a general probability table that. Tokens of incoming emails may be searched for in the user probability table, and if not found, the general probability table to calculate the probability that the email is a spam.

5 Claims, 5 Drawing Sheets

MAIL SERVER PROBABILITY SPAM FILTER

FIELD OF THE INVENTION

The present invention relates to a method of filtering spam from a flow of emails sent to a plurality of users via a mail server, and more specifically relates to a method of using a combination of filters, including a probability filter that uses both general email data and user specific email data to divert spam from reaching the plurality of users.

BACKGROUND OF THE INVENTION

Users of the internet routinely send electronic messages, commonly known as emails, to each other over the internet. Emails may contain, for example, text, links to web pages or even multimedia data. Emails are a very popular form of communication over the Internet due to the variety of data that may be transmitted, large number of available recipients, speed, low cost and convenience.

The emails may be sent, for example, between friends and family members or between coworkers thereby substituting for traditional letters and office correspondences in many cases. This is made possible because the Internet has very few restrictions on who may send emails, the number of emails they may be transmitted and who may receive the emails. The only real hurdle for sending emails is the requirement is that the sender know the email address of the intended recipient.

The emails travel across the Internet, typically passing from server to server, at amazing speeds achievable only by electronic data. The Internet has the ability to send an email anywhere in the world, often in less than a few minutes. Delivery times are continually being reduced as the internet's ability to transfer electronic data improves.

Most internet users find emails to be much more convenient than traditional mail. Traditional mail requires stamps and envelops to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and internet connection have been purchased, there are typically few additional costs associated with sending emails. This remains true even if millions, or more, of emails are sent by the same user. Emails thus have the extraordinary power of allowing a single user to send one or more messages to a very large number of people at an extremely low cost.

However, emails' low cost and ease of use have lead to a problem for many Internet users. A small minority of Internet users, typically small commercial enterprises trying to sell a product or service or organizations trying to deliver a message, have created automated processes for indiscriminately sending unsolicited emails to millions, or more, of Internet users. These unsolicited automated emails are typically unwanted by the recipients and are known as spam. Since each Internet user has different preferences in regards to receiving emails, the definition of spam, or what constitutes unwanted emails, may change slightly from user to user.

Each individual spam received by a user uses only a small amount of the user's email account's allotted disk space, requires relatively little time to delete and does little to obscure the email desired by the user. Even a small number of spam, while many users would still find annoying, would nonetheless cause relatively few real problems. However, the number of spam transmitted over the Internet is growing at an alarming rate. While a single or small number of spam is annoying, a large number of spam can fill a user's email account's allotted disk space thereby preventing the receipt of desired emails. Also, a large number of spam can take a significant amount of time to delete and can even obscure the presence of desired emails in the user's email account.

Spam currently comprise such a large portion of Internet communications that they actually cause data transmission problems for the Internet as a whole. Spam create data log jams thereby slowing the delivery of more desired data through the Internet. The larger volume of data created by spam also requires the providers of Internet hardware to buy larger and more powerful, i.e. more expensive, equipment to handle the additional data flow caused by the spam.

Spam have a very poor response rate compared to other forms of advertisement. However, since almost all of the costs/problems for transmitting and receiving spam are absorbed by the recipient of the spam and the providers of the hardware for the Internet, spam is nevertheless commercially viable due its extremely low cost to the transmitter of the spam.

In an effort to reduce the number of emails received, users have installed spam filters on their computers. However, several problems have been noticed by the Applicants with this method. The users' computers (also know as clients) spend processing power in performing the filtering process. Also, the filters on the users' computers receive very little additional data, i.e. only the additional data received by each specific user, that may be used to improve the filter.

Thus there is a need for an improved method of blocking or removing spam from a stream of emails sent to an Internet user that does not tie up client resources and that improves its filtering process by receiving additional information from multiple users.

SUMMARY OF THE INVENTION

The present invention addresses these needs by providing improved systems and processes for filtering and removing spam messages from a stream of emails. The spam filtering system includes a mail server, a spam filter residing on the mail server and an internet interface for receiving emails from a plurality of senders and for transmitting emails to a plurality of clients. The spam filter may include a white filter, a black filter, a probability filter and a keyword filter.

The mail server receives a stream of emails from various senders addressed to the users of the mail server. The emails in the stream may be undesired spam or may be desired emails. The spam filter attempts to remove the spam emails while delivering the desired emails to the users. To reliably accomplish this, the spam filter may have multiple levels (filtering techniques). A white list and a black list may be used to check if the sender of the email has already been explicitly identified as a creator of desired email or spam respectively. If the sender is on the white list, the email is considered desired email and transmitted to the user. If the sender is on the black list, the email is considered spam and diverted from the user.

A probability filter may be used on emails not filtered out by the white or black lists. A preferred probability filter starts with a General Mail Corpus, a General Spam Corpus, a User Mail Corpus and a User Spam Corpus. These corpuses may be built using past emails that have been identified as spam or desired emails. The general corpuses are made from spam (General Spam Corpus) and desired emails (General Mail Corpus) received by multiple users, while the user corpuses are made from spam (User Spam Corpus) and desired emails (User Mail Corpus) sent to a specific user of the filter. Using statistical calculations, a General Probability Table, based on emails in the General Spam Corpus and the General Mail Corpus, and a User Probability Table, based on emails in the User Spam Corpus and the User Mail Corpus may be created. The probability tables may contain a list of tokens and a corresponding calculated probability (Token Score) the email is a spam based on the occurrence of the token in the email.

An incoming email may be parsed into a series of tokens and a Token Score may be found in the User Probability Table for each token in the email. If a token is not found in the User Probability Table, the Token Score may be found in the General Probability Table. If the token is also not found in the General Probability Table, the token may either be ignored or assigned a nominal value such as about 50%. Using all or a subset of the Token Scores, an Email Score, representing a calculated probability the email is a spam based on the past occurrences of all or the subset of the tokens in the email, may be calculated. If the Email Score is above a predetermined value the email may be considered a spam and included in the General Spam Corpus and the User Spam Corpus and not delivered to the user. If the Email Score is not above the predetermined value, a keyword filter may be used to test the email. If a keyword filter is not being used, then the email is considered desired email and added to the General Mail Corpus and the User Mail Corpus and transmitted to the user.

A keyword filter may also be used to screen the incoming emails for spam. An incoming email may be searched for words, html tags, known spam addresses or other symbols on a keyword list that are known to come almost exclusively from spam emails. Emails without any of the keywords may be added to the General Mail Corpus and User Mail Corpus and delivered to the user, while emails containing one or more of the keywords may be added to the General Spam Corpus and User Spam Corpus and not delivered to the user.

DETAILED DESCRIPTION OF THE PREFERRED EMBODIMENTS

The present invention will now be discussed in detail with regard to the attached drawing figures which were briefly described above. In the following description, numerous specific details are set forth illustrating Applicant's best mode for practicing the invention and for enabling one of ordinary skill in the art to make and use the invention. It will be obvious, however, to one skilled in the art that the present invention may be practiced without many of these specific details. In other instances, well-known machines or processes have not been described in particular detail in order to avoid unnecessarily obscuring the present invention.

Unless otherwise indicated, like parts and processes are referred to with like reference numerals.

Figure 1:
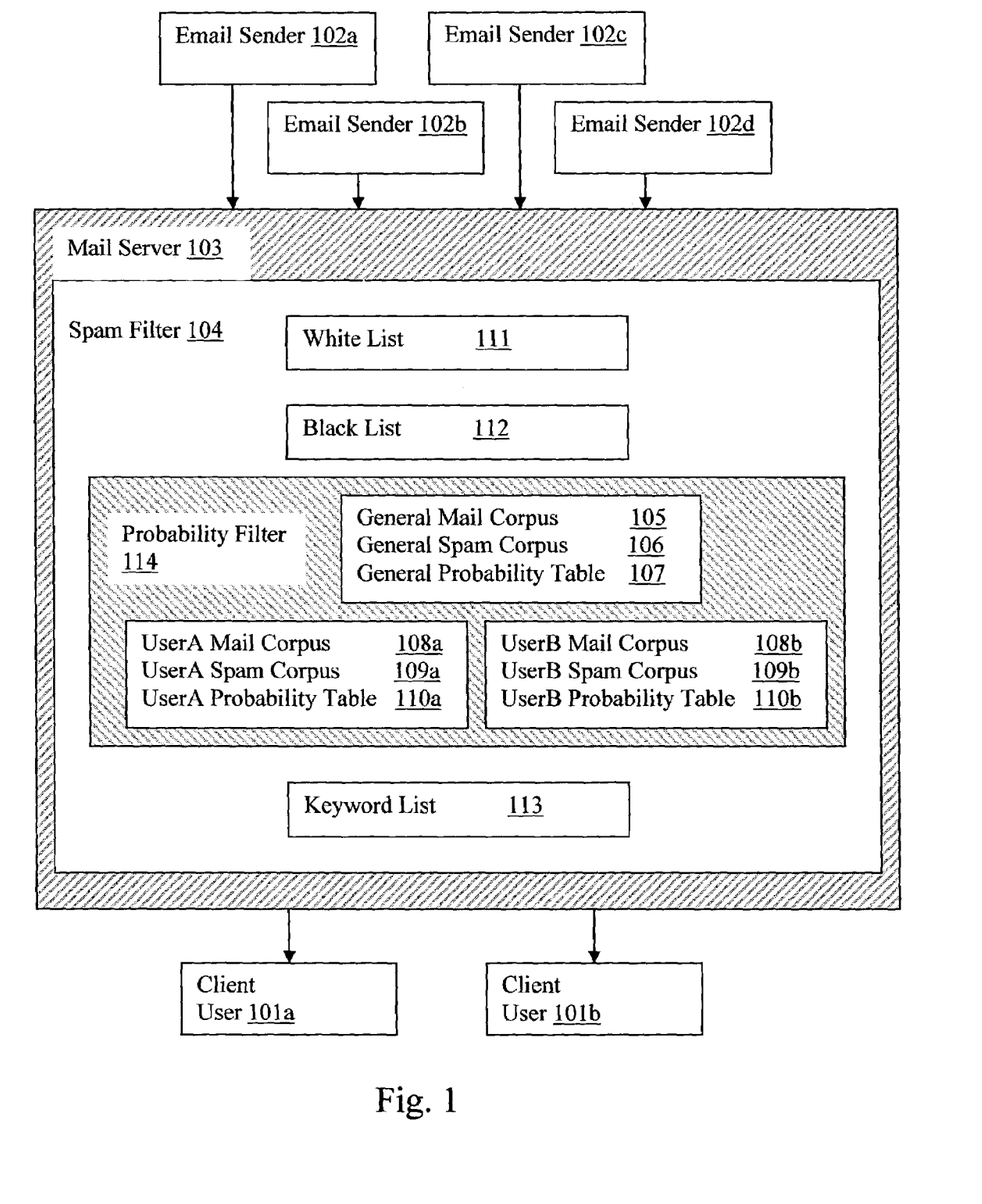
FIG. 1 is a block diagram illustrating the interconnections between email senders, a mail server containing a spam filter and users.

A system for diverting spam in a stream of emails from email senders 102a-d to users 101a-b, i.e. email recipients, is illustrated in FIG. 1. The email senders 102a-d may be, for example, commercial enterprises, family members, friends and coworkers of the users 101a-b. Email addresses identify a mail server that handles the email for a plurality of user. The addressed mail server 103 receives an incoming stream of emails and delivers each email to the user 101a-b specifically addressed by the email. The mail server 103 may have a spam filter 104 that identifies and removes any spam found in the stream of incoming emails prior to delivering the email to the addressed user 101a-b. For spam filter 104 may include more than one type of spam filtering technique. In a preferred embodiment, the spam filter 104 includes a white list 111, a black list 112, a probability filter 114 and a keyword list 113.

Placing the spam filter 104 on the mail server 103 has several advantages over the prior art. The mail server 103 will almost always be more powerful in terms of computing power than the user's client 101a-b. This allows the mail server 103 to perform powerful spam filters that would be too difficult or time consuming for the user 101a-b to perform. In a preferred embodiment, the probability filter 114 "learns" from past emails how to differentiate between spam and nonspam emails as more fully explained below. Placing the spam filter 104 on the mail server 103 gives the probability filter 114 access to many more emails than would be possible if each user 101a-bwhere to have its own spam filter. The larger database of emails made available to the probability filter 114 increases the reliability of the spam filter 104.

Figure 3A:
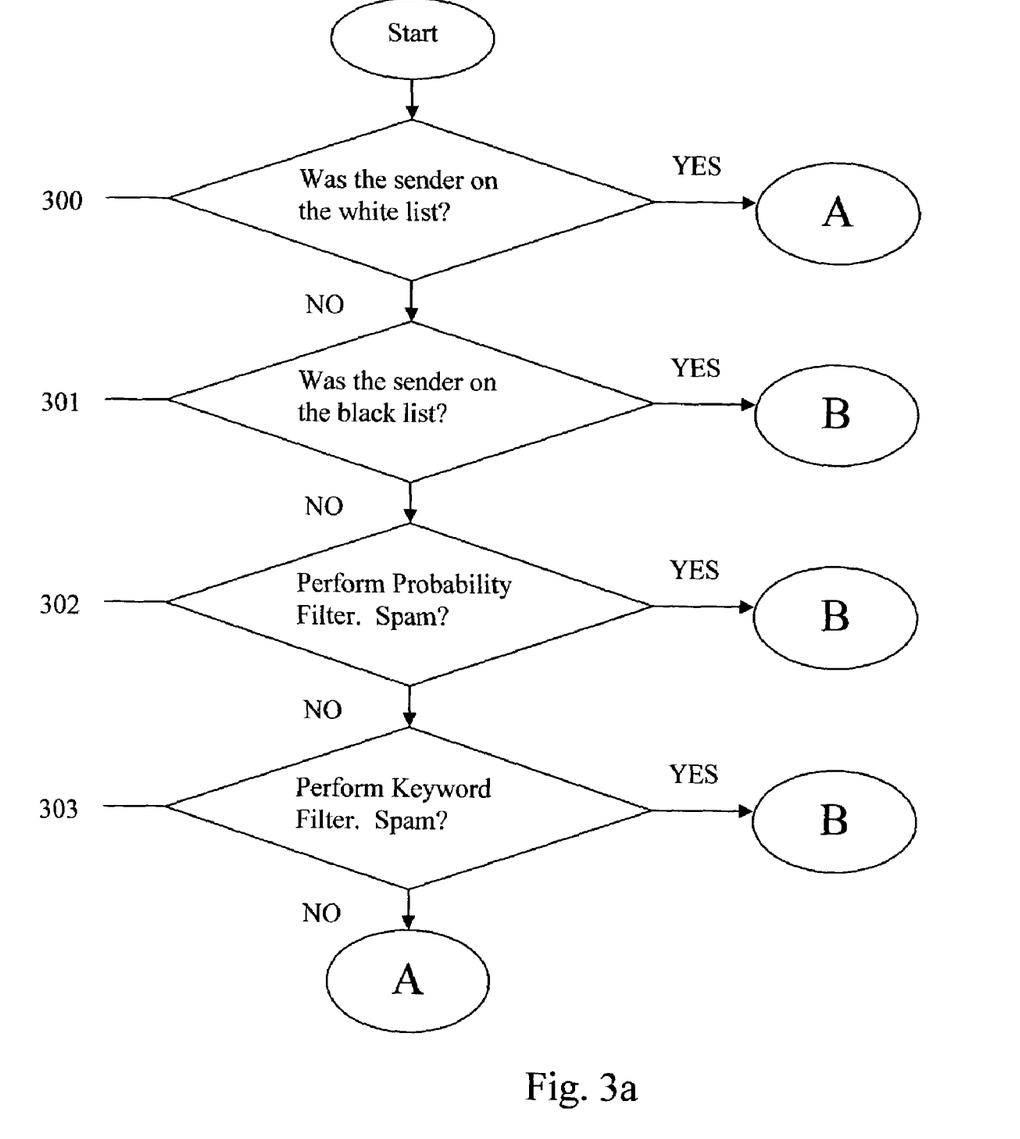
FIGS. 3a and 3b are a flowchart illustrating a process for using a multiple level filter system.
Figure 3B:
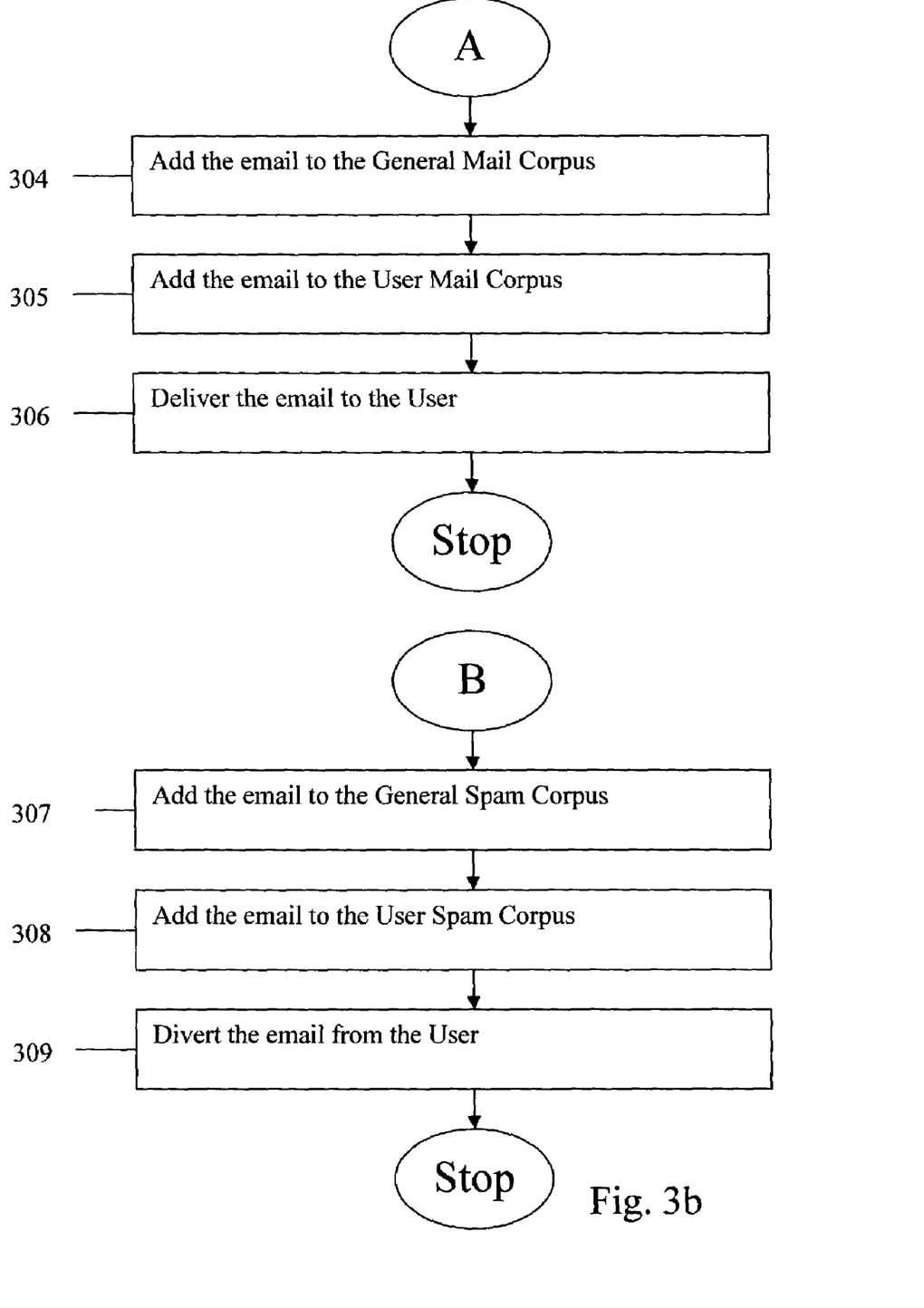

A preferred four level filtering process for screening spam emails from a flow of incoming emails is illustrated in FIGS. 3a-b. A first level may involve creating a white list 111. The white list 111 may be a general white list 111 usable by all the users 101a-b, but is preferably a personalized white list 111 created for each user 101a-b. White lists 111 are advantages in that they are fast and easy to implement. This technique insures that emails from those on the white list 111 always get to the recipient. Advantageously, the white list 111 is a list of possible email senders 102a-d that have been specifically preapproved to send emails to the users 101a-b. Specifically, identifying information that is transmitted with emails on the "from:" line is placed in the white list to later identify those that have been preapproved. Family members, friends, coworkers, etc. may be placed on the white list 111 while generators of spam, of course, will not be placed on the white list 111. Software may then be used to search the "from:" line in all incoming emails to determine who sent the email. (Step 300) If the transmitter of the email is on the white list 111, then the email may be added to the general mail corpus 105 (step 304), added to the user mail corpus 108a-b (step 305) and delivered to the user (step 306). If the transmitter of the email is not on the white list 111, the email may be subjected to further filtering techniques.

However, white lists 111 are of limited usefulness since they require the user 101a-b to know everybody the user 101a-b might want to receive email from. While the white list 111 may be continually updated and enlarged, it is difficult for most users 101a-b to know in advance everybody they may want to receive email from. This greatly restricts the recipient's ability to receive email from unexpected sources and increases the chance that a desired email will be blocked. Thus white lists 111 are preferred to be used as an initial screening process to quickly transmit emails from preapproved sources to the user 101a-b while leaving the remaining emails for further screening. This will prevent emails from approved sources being incorrectly blocked by another screening technique and shortens the screening time for the incoming emails since this technique is relatively quick. Senders not initially on the white list 111 may be added if it is determined by other spam filtering techniques that the email they sent is not spam.

Another method for blocking spam involves creating a black list 112 that lists known creators of spam. This method is also very fast as software may be used to parse the incoming emails and determine if the sender on the "from:" line in the email is on the black list. (step 301) Emails from senders on the black list 112 are preferably automatically added to the general spam corpus 106, (step 307), added to the user spam corpus 109a-b (step 308) and diverted from the user 110a-b (step 309). One problem with using a black list 112 is that creators of spam may forge the information on the "from:" line or simply change email addresses that they are transmitting form to avoid identification. In addition, new sources of spam are always being created. To combat these problems, the black list 112 may be continually updated, but will often be one step behind the creators of spam.

Figure 2A:
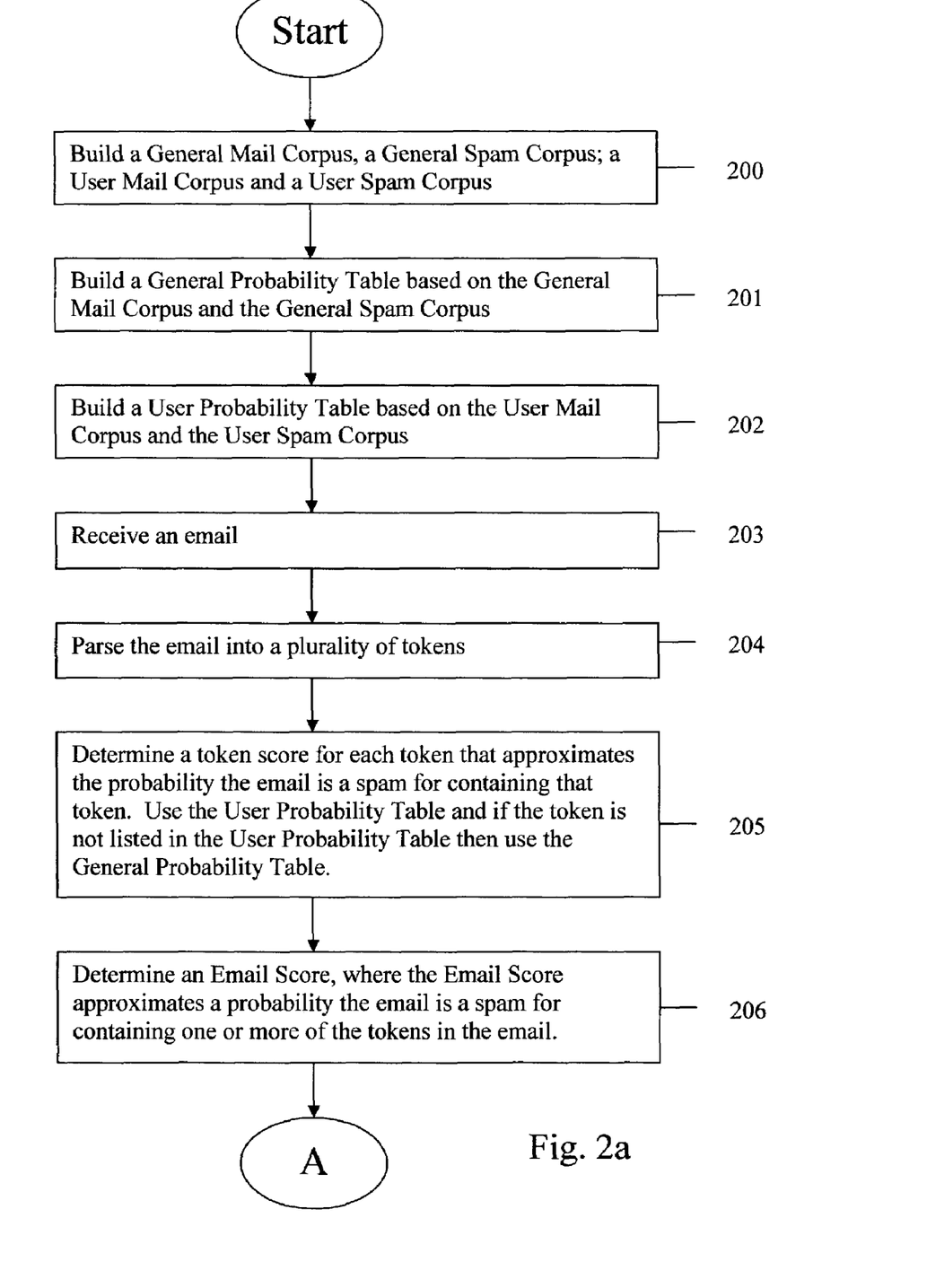
FIGS. 2a and 2b are a flowchart illustrating a process for diverting spam sent to a user using a probability filter that incorporates data from emails sent to multiple users and emails sent to the user.
Figure 2B:
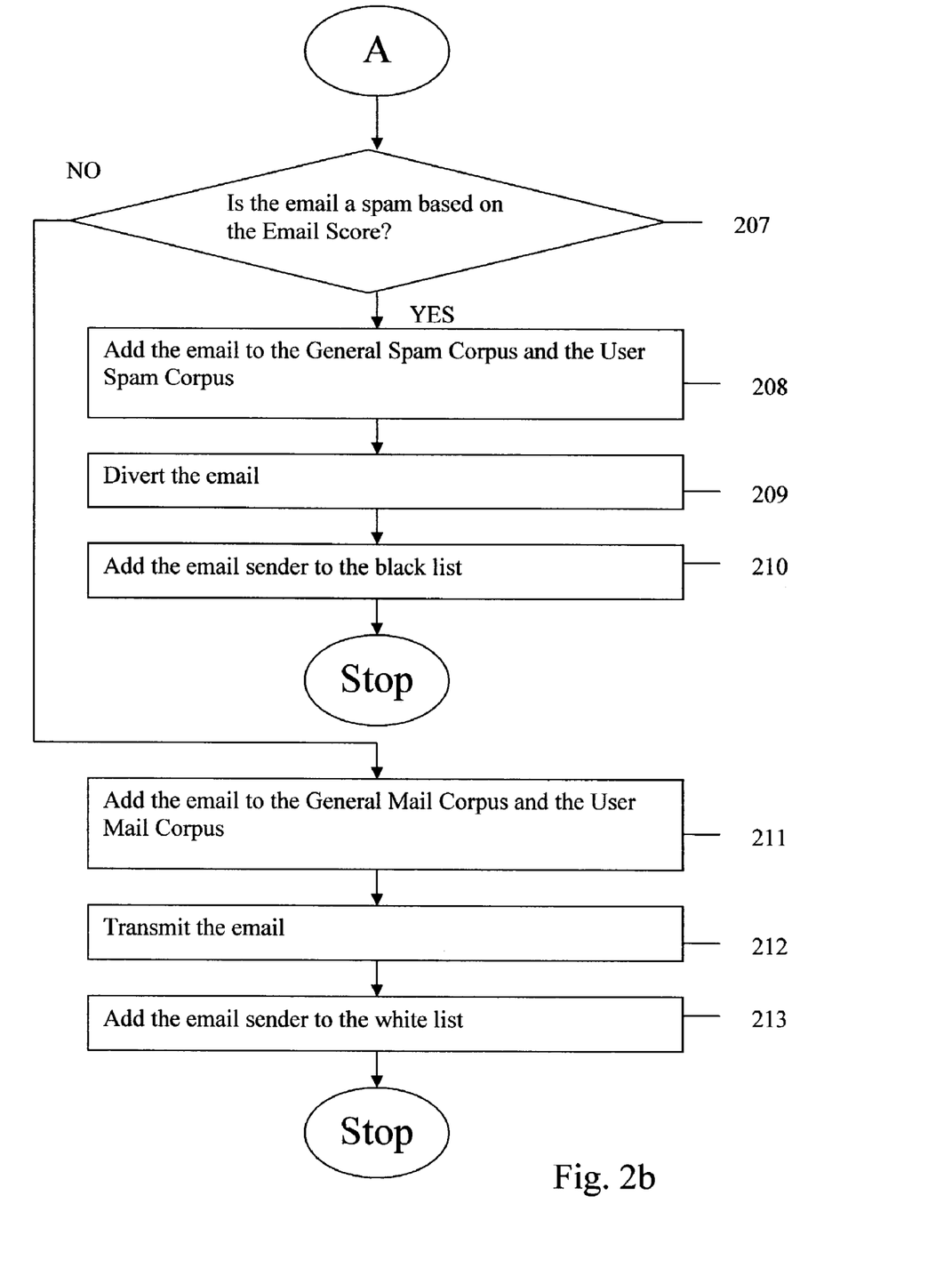

Another method of blocking spam involves determining the probability an email is a spam based on the probabilities of each, or some subset, of the tokens in the email being in a spam or a nonspam. (step 302) FIGS. 2a-b illustrate an exemplary method of implementing a probability filter 114. This method requires building a general mail corpus 105, a general spam corpus 106, a user mail corpus 108a-b, and a user spam corpus 109a-b. (step 200) The general mail corpus 105, general spam corpus 106, user mail corpus 108a-b, and user spam corpus 109a-b may be built simply by concatenating emails sent to a plurality of users 101a-b that have been identified as nonspam, concatenating emails sent to a plurality of users 101a-b that have been identified as spam, concatenating emails sent to a particular user 101a-b that have been identified as nonspam and concatenating emails sent to the particular user 101a-b that have been identified as spam, respectively. The advantage of using the recipient's spam and nonspam, as opposed to spam and nonspam sent to other users, is that this permits a customized filtering technique to be created for the recipient. Recipients tend to receive spam having similar contents since a transmitter of spam will often continue to target the same recipients. Recipients also tend to receive nonspam having similar contents since recipients tend to receive emails discussing the same topics of interest and are typically sent by the same people (friends, family, coworkers, etc.).

However, building a user mail corpus 108a-b and user spam corpus 109a-b is not possible for a new email recipient. Even after a few spam and nonspam have been received, the resulting user mail corpus 108a-b and user spam corpus 109a-b will generally be too small and will provide only limited use. For these reasons a general mail corpus 105 and a general spam corpus 106 may also be created using the spam and nonspam from a multitude of other recipients of email.

A process for determining a general probability table 107 (which all users 101a-b may use) will now be described, but the same process may be used to determine a custom user probability table 110a-b for each user.

The general mail corpus 105 and the general spam corpus 106 may be parsed into tokens, i.e. words or other character strings separated by chosen delimiters. In a preferred embodiment, the delimiters are anything other than ASCII characters, numbers, and the special characters "$", "-", "'". In addition, html tags may also be broken out as individual tokens. The entire text of the message may be scanned, including the headers in order to obtain all the possible useful tokens in the email. The case of each character in the tokens may be considered, but is preferably ignored to simplify the process. In a preferred process, if the character is "valid" (ASCII, a number, '$', '-',''' (apostrophe)) it gets included in the token. If the character is not valid, the token is ended. The token may then be checked to see if it fits certain minimum and maximum specifications. For example, the token may be discarded if it is shorter than about 3 characters or longer than about 20 characters.

The header fields may be parsed using rules that are different from the rules for parsing the rest of the email. For example, a special designator may be placed at the beginning of tokens pulled from the header. The designator may depend on the field the token is pulled from, e.g. a simple '*' for generic fields, 'r*' for reply to, etc.

A token mail count and a token spam count may be found for each token found in the general mail corpus 105 and the general spam corpus 106 respectively. The token mail count and token spam count may represent either the number of occurrences of a token, or alternatively, the number of emails containing at least one occurrence of the token. A mail corpus and a spam corpus may also be found that represents either the total number of emails or the total number of all tokens in the general mail corpus 105 and the general spam corpus 106, respectively.

A general probability table 107 may be created using known probability techniques and the above collected data. (step 201) The general probability table 107 may include a list of all the tokens found in the general mail corpus 105 and the general spam corpus 106 along with an associated token score. The token score may advantageously approximate a percentage that an email is a spam if it contains the token score's associated token. An example method of calculating a token score is as follows:

A Token Score for each token in the general probability table 107 may be calculated as:

$$\text{Token Score} = \frac{(\text{Token Spam Count}/(\text{Spam Corpus}+1))}{((\text{Token Spam Count}/(\text{Spam Corpus}+1)) + (\text{Token Mail Count}/(\text{Mail Corpus}+1)))}$$

In a similar manner, a user probability table 110a-b may be created for each user 101a-b using the user's associated user mail corpus 108a-b and the user spam corpus 109a-b. (step 202) The process for creating a user probability table 110a-b may be repeated until every user 101a-b has a custom user probability table 110a-b.

The general probability table 107 will typically have been created using a large general mail corpus 105 and a large general spam corpus 106 resulting in the general probability table 107 being based on a large amount of data. However, the user probability tables 110a-b will typically be based on a much smaller amount of data. The user probability tables 110a-b may therefore need to be biased towards 0.5 to prevent big swings in the early stages of training the probability filter 114. The user probability tables may be biased, for example, by the following formula:

$$\text{Token Score} = \frac{(\text{Token Score} * (\text{Token Spam Count} + \text{Token Mail Count}) + (0.5 * 2))}{(\text{Token Spam Count} + \text{Token Mail Count} + 2)}$$

If a Token Score is found for a token in the both the user probability table 110a-b and the general probability table 107, the Token Score in the user probability table 110a-b may be furthered biased with the Token Score in the general probability table 107. The amount of influence depends upon how many times the user 101a-b has seen a given token.

$$\text{Skew} = (\text{Token Spam Count} + \text{Token Mail Count})/5$$

$$\text{Token Score} = \frac{(\text{Skew} * \text{user Token Score} + \text{general Token Score})}{\text{Skew} + 1}$$

This resulting value may then used as the final Token Score. If no general token score was found for a token the results of the previous calculation may be used as the Token Score.

Token Score is the biased probability an email is a spam if it contains a given token. This value and its associated token are stored in either the general probability table 107 or a user probability table 110a-b.

Token Mail Count may be either the number of occurrences of the token in the general or user mail corpus 105 or 108a-b or the total number of emails in the general or user mail corpus 105 or 108a-b containing at least one occurrence of the token.

Mail Corpus may be either the number of tokens in the general or user mail corpus 105 or 108a-b or it may be the number of emails in the general or user mail corpus 105 or 108a-b.

Token Spam Count may be either the number of occurrences of the token in the general or user spam corpus 106 or 109a-b or the number of emails in the general or user spam corpus 106 or 109a-b containing at least one occurrence of the token.

Spam Corpus may be either the number of tokens in the general or user mail corpus 106 or 109a-b or it may be the number of emails in the general or user spam corpus 106 or 109a-b.

While various combinations of counting methods for the above variables may be used, the Mail Corpus and Spam Corpus preferably represent the number of emails in their respective corpuses and the Token Mail Count and Token Spam Count preferably represent the number of occurrences of the token in the corpus.

An adjustment may need to be made for those tokens that appear only in a general mail corpus 105 or a user mail corpus 108a-b or only in a general spam corpus 106 or a user spam corpus 109a-b. Using the above formula will produce a Token Score of either a 100% spam probability if a token is found only in one of the spam corpuses or a 0% probability if a token is found only in one of the mail corpuses. It would therefore be possible for a later email to contain both a token indicating a 100% probability of being a spam and another token indicating a 0% probability of being a spam. To avoid this paradoxical result, tokens with a 100% probability and 0% probability are preferably adjusted to avoid the paradox.

One method of adjusting the 100% or 0% values involves changing a token with a Token Score of 100% to, for example, about 99%, while changing a Token Score with a probability of 0% to, for example, about 1%. Alternatively, Token Scores with a 100% or 0% value in one of the user probability tables 110a-b, but with a different value in the general probability table 107 may either use the Token Score from the general probability table 107 or may be scaled with the Token Score from the general probability table 107.

The mail server 103 will receive a stream of incoming emails from the plurality of email senders 102a-d. (step 203) All incoming emails may be parsed into tokens (step 204) and each token's probability that an email is a spam if it contains that token may be found by reference to the user probability table 110a-b. A token not found in the user probability table may be searched for in the general probability table 107. Tokens that are not found in either the user probability table 110a-b or the general probability table 107 may be ignored or alternatively assigned a value of about 50%. (step 205)

The probability an email is a spam may be calculated using all or a subset of the tokens in the incoming email. (step 206) In one embodiment, a predetermined number of tokens, for example 10, of the most reveling tokens, i.e. those tokens closest to a 0% or 100%, may be selected and further analyzed. However, selecting a small number of tokens tend to polarize the results. The polarized results do not indicate the actual probability that an email is a spam and also makes it difficult to make small adjustments in how "spam like" an email is before it is considered a spam. In another embodiment, all tokens with a probability greater than about 60% or less than about 40% may be selected for analysis. In yet another embodiment, all tokens in the incoming email are selected for analysis.

The probability that an email is a spam using any of these methods may be found using the following formula:

$$\text{Email Score} = \frac{1}{(1 - \text{Token Score}(i)) * (1 - \text{Token Score}(i+1)) \ldots * (1 - \text{Token Score}(n))}$$

Where:

Email Score represents a calculated value for the percentage chance the email is a spam.

Token Score(i), Token Score (i+1) ... Token Score(n) are the Token Scores for the selected tokens in the email.

In another embodiment, the Email Score may be calculated as:

"Spamminess"

$$P = 1 - ((1 - \text{Token Score}(i)) * (1 - \text{Token Score}(i+1)) * \ldots * (1 - \text{Token Score}(n)))\hat{}(1/n)$$

"Non-spamminess"

$$Q = 1 - (\text{Token Score}(i) * \text{Token Score}(i+1) * \ldots * \text{Token Score}(n))\hat{}(1/n)$$

Combined Indicator $$S = (P - Q)/(P + Q)$$

Scale from −1 to +1 to 0 to +1

$$\text{Email Score} = (1 + S)/2$$

Incoming emails with an Email Score, i.e. spam probability, greater than a predetermined cut off value, preferably 50%, (step 207) may be added to the user spam corpus 109a-b, the general spam corpus 106 (step 208) and then diverted from the user (step 209) while the remaining emails are added to the user mail corpus 108a0b, the general mail corpus 105 (step 211) and then transmitted to the user 101a-b (step 212). The cut off value may be adjusted by the user depending on the user's personal needs. For example, if the user has a low tolerance for accidentally deleting a nonspam email, i.e. a false positive, the cut off value may be raised, for example, to about 55%. In another embodiment, an email sender of a diverted email may be placed on a black list while a sender of a transmitted email may be placed on a white list. (steps 210, 213) The above process, as described, may automatically add incoming emails identified as nonspam into the general mail corpus 105 and the user mail corpus 108a-b and may automatically add incoming emails identified as spam into the general spam corpus 106 and the user spam corpus 109a-b. However, Applicants have discovered that automatically adding incoming emails into the corpuses, i.e. autotraining, may cause problems. Specifically, Applicants have noticed that mistakes made by the probability filter 114 are reinforced by this method since the mistakes in autotraining cause spam to be introduced into the mail corpuses and nonspam emails to be introduced into the spam corpuses.

Thus, in an alternative embodiment, incoming emails are never added to the corpuses 105, 106, 108a-b, 109a-b or are added in only very limited situations. A limited situation may be, for example, only emails that have been identified by a human, e.g. a user 101a-b, may be added to the corpuses. This prevents the probability filter 114 from reinforcing its own mistakes. In a preferred embodiment, an email is only added to the corpuses if the user 101a-b has specifically identified the email as having been improperly classified as either spam or nonspam. Adding improperly classified emails into their correct corpuses improves the probability filter 114 making the probability filter 114 less likely to make a similar mistake in the future.

Another method of blocking spam is to use a keyword list 113, i.e. search the email for keywords exclusively, or almost always, found only in spam. (step 303) The keyword list 113 method may comprise a regular expression comparison and scan incoming emails for particular words, html tags or phrases stored on a keyword list 113, preferably ignoring case. Spam typically uses particular terms, for example sales pitch terminology, sexually explicit references and html commands that are almost never found in nonspam emails. If one or more of these keywords are found in the email message, the email may be automatically treated as a spam, otherwise the email is treated as nonspam. This method has the advantage that the message does not have to be tokenized for the purposes of the keyword filter. However, keyword filters are easy to break, as filtering on "this is not spam" can be broken by munging the keyword within the message. For example: "This is not s pam" or "This is not sp*m" might slip past a keyword filter.

Two or more spam filtering methods may be used in combination to improve the speed and reliability of the overall spam filter. In a preferred embodiment, a white list filter and a black list filter may be used as a first and a second level filter. A white list filter will quickly provide a final determination for many of the incoming emails thereby improving the speed of the overall spam filter and also prevents an accidental classification by one of the later filtering techniques. A black list filter will also quickly provide a final determination for many of the incoming emails thereby eliminating known sources of spam from the incoming stream of emails. If more emails come from senders on the white list than on the black list, there is a slight speed advantage to performing the white list filter first. On the other hand, if more emails come from senders on the black list than on the white list, there is a slight speed advantage for performing the black list filter first.

A probability filter 114 and, if used, a keyword list 113 may be used as a third and a fourth level filter. These two filters are used after the white and black list filters to provide a rigorous test of uncertain senders, i.e. those senders that the user has not explicitly allowed or disallowed. The keyword list 113 is optional since Applicants have noticed that keyword lists 113 rarely catch anything that probability filters 114 would not have already caught. However, when a keyword list 113 is used and does happen to catch something the probability filter 114 missed, the probability filter 114 may then train on that message making the probability filter 114 better.

Emails that have been identified as spam may simply be erased or deleted, however, in a preferred embodiment, the spam emails are place in a special area or folder accessible to the user 101a-b. This allows the user 101a-b to search the spam emails if the user 101a-b suspects that an email was incorrectly identified as a spam or if the user 101a-b wants to review the spam for some other purpose.

Another option is to allow a user 101a-b to specifically identify an email as a spam or a nonspam in cases where the spam filter 104 made a mistake. While false positives (identifying a nonspam as a spam) and false negatives (identifying a spam as a nonspam) are fairly rare once the corpuses are of sufficient size, this option allows the probability filter to learn from its mistakes, thereby increasing the effectiveness of the spam filter 104.

In view of the foregoing, it will be understood by those skilled in the art that the systems and processes of the present invention can facilitate the filtering out of spam from a user's stream of email. The above-described embodiments have been provided by way of example, and the present invention is not limited to these examples. Multiple variations and modification to the disclosed embodiments will occur, to the extent not mutually exclusive, to those skilled in the art upon consideration of the foregoing description. For example, not all incoming emails have to be added to one or more of the general or user corpuses. Also, new Token Scores for the user probability table 110a-b and general probability table 107 do not have to be recalculated after every email. Their associated probability data may be updated only from time to time as needed, but preferably are updated on a periodic basis such as about once every 24 hours. Also, any combination of filters may be used and any order of the filters may be used, although the preferred order is as outlined above. Such variations and modifications, however, fall well within the scope of the present invention as set forth in the following claims.

What is claimed is:

1. A process for filtering spam emails from a stream of emails, comprising the steps of:
   A) building a general mail corpus, a general spam corpus; a user mail corpus and a user spam corpus;
   B) building a general probability table based on the general mail corpus and the general spam corpus, wherein the general probability table includes a list of tokens and a corresponding list of probabilities that an email is a spam for containing the corresponding token;

C) building a user probability table based on the user mail corpus and the user spam corpus;
   wherein the user probability table includes a list of tokens and a corresponding list of probabilities that an email is a spam for containing the corresponding token;
D) receiving an email;
E) parsing the email into a plurality of tokens;
F) finding a token score for each token in the plurality of tokens, comprising the steps of:
   a) searching the user probability table for each token;
   b) if a token is not listed in the user probability table, searching the general probability table for that token; and
   c) if the token is also not listed in the general probability table, ignoring the token or setting the token to a nominal value;
G) determining an email score, wherein the email score approximates a probability the email is a spam for containing all or some subset of the tokens in the email;
H) if the email score is above a predetermined value, diverting the email; and
I) if the email score is not above the predetermined value, transmitting the email to a user.

2. The process for claim 1, further comprising the steps of:
J) adding a diverted email to the user spam corpus; and
K) adding a transmitted email to the user mail corpus.

3. The process for claim 2, further comprising the steps of:
L) adding a diverted email to the general spam corpus; and
M) adding a transmitted email to the general mail corpus.

4. The process for claim 3, further comprising the step of:
N) performing a white list filter before step E) and, if a sender of the email is on a white list, transmitting the email to a client, adding the email to the user mail corpus, adding the email to the general mail corpus and stopping the filtering process for the email.

5. The process for claim 4, further comprising the step of:
O) performing a black list filter before step E) and, if a sender of the email is on a black list, diverting the email, adding the email to the user spam corpus, adding the email to the general spam corpus and stopping the filtering process for the email.

* * * * *